(No Model.)
O. LUGO.
PROCESS OF PURIFYING WATER.
No. 535,802. Patented Mar. 12, 1895.
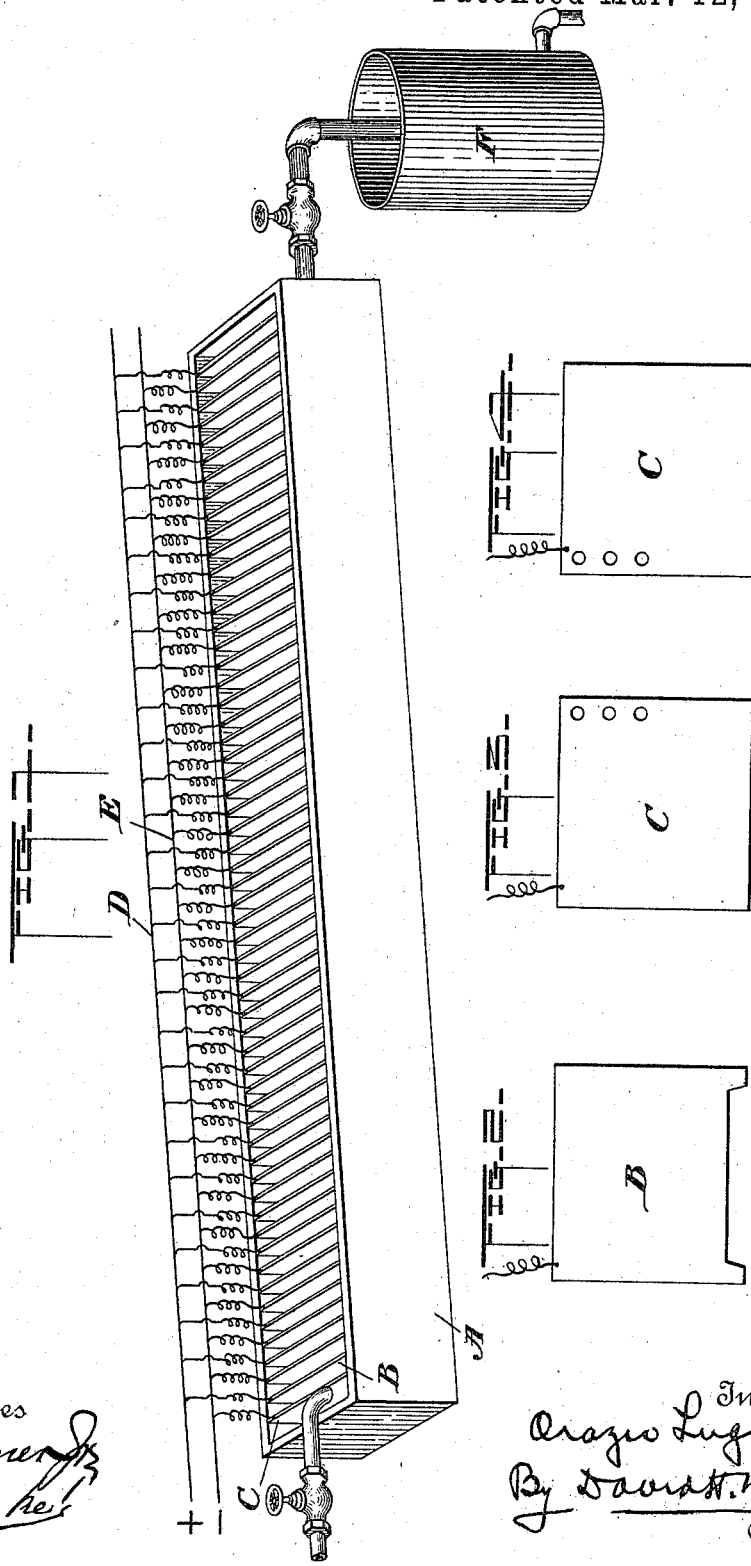

UNITED STATES PATENT OFFICE.

ORAZIO LUGO, OF JERSEY CITY, NEW JERSEY, ASSIGNOR TO THE POTABLE WATER COMPANY, OF SAME PLACE.

PROCESS OF PURIFYING WATER.

SPECIFICATION forming part of Letters Patent No. 535,802, dated March 12, 1895.

Application filed October 30, 1894. Serial No. 527,465. (No model.)

*To all whom it may concern:*

Be it known that I, ORAZIO LUGO, a citizen of the United States, residing at Jersey City, in the county of Hudson and State of New Jersey, have invented certain new and useful Improvements in Processes of Purifying Water; and I do hereby declare the following to be a full, clear, and exact description of the invention, such as will enable others skilled in the art to which it appertains to make and use the same.

This invention relates to purifying water.

The object of this invention is to render water in large and small quantities potable and of a uniform purity, at small cost, and without requiring extensive apparatus.

The invention consists primarily in the purification of water by subjecting it to a current of electricity applied by means of electrodes retained in contact with the water under treatment, the anode being composed of aluminum.

The invention consists further in the purification of water by subjecting it to the action of a current of electricity applied by means of electrodes, the anode being composed of aluminum, the water being caused to flow during the treatment in a circuitous direction, through a tank or the like containing the electrodes, in order to insure the contact of the water with the greatest possible electrode surface.

Numerous attempts have been made to purify impure or polluted water and render it potable or suitable for use in the arts. With the exception of distillation, which is too costly, and in most instances unsatisfactory, for the purification of water for drinking purposes, none of these attempts have proven unqualified successes, most of them being out of general use or nearly so. The methods utilized for the purpose have usually involved the use of noxious chemicals in order to remove other impurities in the water. The most common method for purifying water has been by filtration, which is successful in removing foreign substances in suspension or partially so; while most of the impurities in solution, remain in the filtrate. The process of distillation is unsatisfactory except to produce water of chemical purity for chemical purposes on account of its removal of those substances and properties of the water which render it potable and pleasing to the taste.

Many attempts have also been made to purify water by the use of an electrolytic process, utilizing electrodes, such as iron and zinc, as the anodes of the electric circuit. The objection to the use of these metals as such described anodes, is that the processes result in the formation of oxides or oxyhydrates of them, whose salts go into solution in the water thus treated. The compounds so formed are deleterious and noxious to health.

As the result of a long series of experiments and tests, in the purification of water, I have found that aluminum is the only metal, capable of practical utilization for the anode of the electric circuit in the electrolytic treatment of water, whose oxyhydrate is not injurious to health. In addition to this, aluminum oxyhydrate is insoluble in water, and may be removed from it by filtration or other suitable mechanical means.

I have discovered that oxyhydrate of aluminum has the property of coagulating the nitrogenous or animal matters in solution or in suspension in impure water, and of bringing them together in an insoluble coagulum or precipitate. In order to produce this oxyhydrate of aluminum in a manner so as to effect the desired results, at the least cost, it is necesssary that metallic plates of aluminum constituting the anodes of electric circuits be immersed in the water to be purified. Simultaneously with the formation of the oxyhydrate of aluminum in the menstrum, a portion of the oxygen gas evolved at the positive pole through the decomposition of the water by the electrolytic process, enters into solution and oxidizes the vegetable matter in solution in the impure water, producing carbonic acid gas which is healthful.

In addition to these above described electro-chemical actions, the electrolysis of any soluble salts of the alkaline earth metals or of any metallic compounds, such as iron, takes place, the metals being deposited on the cathodes. The result of the entire process is the almost complete purification of the water (other than salt water), irrespective of its source or condition.

In carrying out the invention, a series of plates are suspended in a tank or runway in which the water to be treated is placed, or through which it is allowed to flow. Any required number of plates may be used and alternate plates are connected in multiple arc to one pole of a dynamo or other source of electrical supply which will give a constant current. The plates which are connected to the positive pole of the dynamo or the like, are of a metal whose oxyhydrate will not go into solution, and is not injurious to health. These plates are therefore of metallic aluminum. The plates which are connected to the negative pole may be composed of aluminum, zinc, iron, or other suitable metal. When the water is allowed to flow continuously through a runway in which the treatment takes place, it is desirable that the course of flow be made tortuous in order to cause it, as before stated, to come into contact with the greatest possible amount of electrode surface.

Obviously, a great number of forms of apparatus for carrying out my invention can be devised, and one form will now be described.

The apparatus is illustrated in the accompanying drawings, in which—

Figure 1, is a perspective view of an apparatus constructed in accordance with my invention. Fig. 2, is a view showing the preferred form of aluminum plates forming the anodes of the electric circuit; and Figs. 3 and 4 are views showing the preferred forms of plates constituting the cathodes of the electric circuit.

In the drawings A represents a tank or runway which may be of any suitable material, preferably of wood or other non-conductor of electricity, and of a sufficient length to cause water admitted at one end and discharged at the other to be brought into contact with enough surface of electrodes to insure its purification by the action of the current of electricity passed through the plates with which it comes in contact. Suspended in this tank or runway are two sets of plates B and C, alternately arranged, which form the anodes and cathodes of an electric circuit connected in multiple arc respectively with the positive and negative poles of an electric generator. The plates are of a size to fit closely to the sides of the tank or runway.

The plates B which are of aluminum are preferably made in the form shown, that is, with a portion of their lower surface cut away to allow the free passage of water beneath them. The plates C, which may be made of aluminum, iron, zinc, or other suitable metal, are preferably provided with a vertical series of holes, c, the holes in each alternate plate C being on different sides from those in adjacent plates C. From this arrangement and form of the plates, it will be clear that water admitted at one end of the tank or runway and allowed to escape at the other end, will be caused to take a circuitous course, and will be brought into contact with the greatest possible amount of electrode surface, insuring thorough treatment by the current of electricity passing through the electrodes, and through the water.

Each plate B is connected to a wire or other conductor D which is connected to the positive pole of the source of electrical energy, and each plate C is connected to a wire or other conductor E, which is connected to the negative pole of the source of electrical energy. Thus, when a current of electricity is passed through the conductor D, it is caused to pass from each positive plate B to each adjacent negative plate C through the water in the tank or runway, and thence back to the source of electric current supply through conductor E. As the water passes from the tank or runway, it is conducted to a filter F, by which the solids or coagulated matter in suspension are removed, or to a centrifugal machine when it is found that a filter will not accomplish the separation of the coagulated matter from the water with sufficient rapidity.

The water when fully treated by the process described, is saturated with oxygen gas to the limit of its solvent power, and is thus rendered healthful and palatable.

The ampèrage and voltage of the current of electricity required to carry out the method depends entirely upon the resistance to the current in the circuit. The resistance depends upon the amount of the electrode surface utilized and the distance apart of the plates. For example, I have found that in a tank or runway twenty feet long, eighteen inches wide and sixteen inches deep, of a capacity of about three hundred gallons of water, in which the electrodes were arranged four inches apart, throughout the course of the whole runway, and were sixteen by eighteen inches in size, an electric current of forty-four volts and forty ampères was used, giving a resistance of one and one-tenth ohms. By the apparatus thus constructed it was found that in so regulating the flow of water that three hundred gallons would pass through the tank every forty minutes, while the electrolytic process was going on, common polluted river water containing large amounts of animal and vegetable impurities or sewage was rendered free from the noxious substances, and the soluble salts of iron, lime and the like present in the water to be purified were reduced to an insoluble state.

By the described method, water containing deleterious or foreign matters is introduced into one end of the runway, while pure and potable water is continually running off at the other end. The process may be continued any length of time, and is equally applicable to the treatment of small quantities, or to quantities sufficient to furnish the largest cities with a continuous water supply.

The major portion of the impurities rendered insoluble and coagulated with the oxyhydrate of aluminum rise to the surface, having been rendered buoyant by the gases set free during the electrolytic treatment, and can easily be removed by skimming or other mechanical means.

The metal aluminum has been used as the anodes of electric circuits in electrolytic processes for the purposes of clarifying sugar solutions and for purifying and aging the products of vinous fermentation. In these processes, however, the electro-chemical actions are entirely different from those in the present instance. In the electrolytic treatment of sugar solutions, with aluminum anodes, certain soluble compounds of aluminum are produced while the electrolytic treatment of water invariably results in the formation of insoluble compounds, so that the entire coagulum produced by them can easily be removed.

To render the soluble compounds insoluble in the treatment of sugar solutions, the addition of chemicals is required, while in the treatment of water electrolytically, no chemicals are needed.

In the treatment of the products of the vinous fermentation electrolytically, using aluminum anodes, the oxyhydrate of aluminum enters into chemical combination with the acids of the alcohols, produced by the oxidation of the aldehydes of their corresponding series and also enters into combination with the free acids present, forming soluble compounds which have to be rendered insoluble and precipitated by extraneous means, for instance, by the action of recently charred wood.

In contra-distinction to the actions which take place in the treatment of sugar solutions and of the products of vinous fermentation, in the treatment of water, the oxyhydrate of aluminum acts as mordant on the nitrogenous or albuminoidal matters aggregating them and forming a coagulum which is insoluble and capable of being removed by mechanical means without the use of reagents, while such oxidation as takes place from the active oxygen evolved at the positive pole, is purely a combustion of the vegetable matters in solution, producing carbonic acid gas.

Having thus described my invention, what I claim as new, and desire to secure by Letters Patent, is—

1. The purification of water by subjecting it to the action of a current of electricity applied by means of electrodes retained in contact with the water under treatment, the anode being composed of aluminum, substantially as described.

2. The purification of water by subjecting it to the action of a current of electricity applied by means of electrodes retained in contact with the water under treatment, the positive electrode being composed of aluminum, the water being caused to flow during treatment, in a circuitous course through a tank or the like containing the electrodes, substantially as described.

3. The purification of water by subjecting it to the action of a current of electricity applied by means of electrodes retained in contact with the water under treatment, the anode being composed of aluminum, and then separating the coagulated matter from the water by filtration, by a centrifugal machine, or in any other suitable way, substantially as described.

In testimony whereof I affix my signature in presence of two witnesses.

ORAZIO LUGO.

Witnesses:
S. G. HOPKINS,
RALPH MCKINZIE.